Patented Sept. 16, 1941

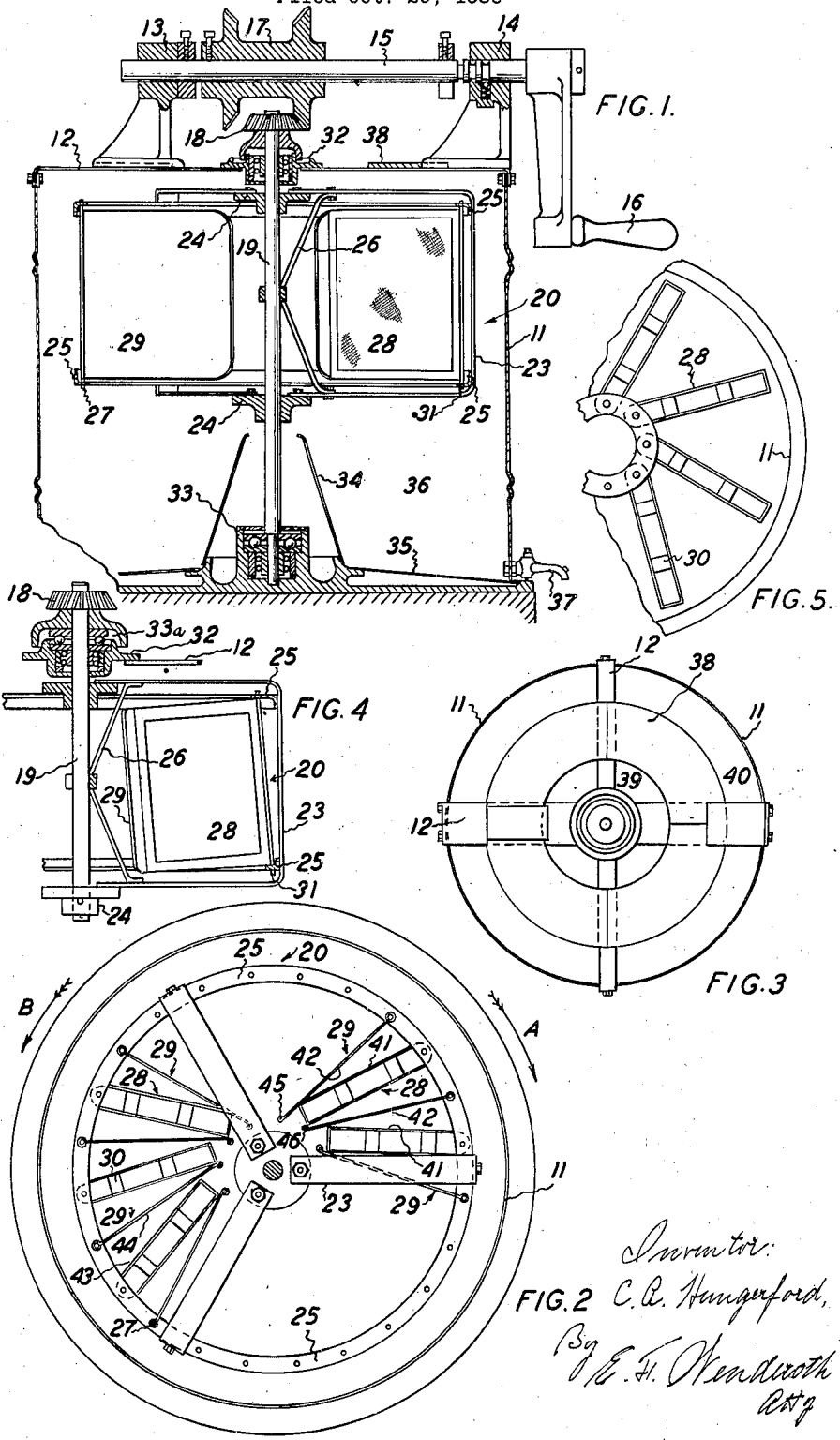

2,255,775

UNITED STATES PATENT OFFICE 2,255,775

CENTRIFUGAL HONEY EXTRACTOR

Clarence Arthur Hungerford, Kurrajong Heights, near Sydney, Australia

Application October 20, 1936, Serial No. 106,665
In Australia January 14, 1936

7 Claims. (Cl. 210—65)

This invention relates to centrifugal honey extractors of the class in which the full combs are first decapped or beheaded, then placed in wire baskets in a cage centrifuge (generally known as a "reel") and the honey extracted from the comb cells by centrifugal force and ejected into a monitor casing within which the reel is installed.

In one known centrifugal honey extractor, the decapped or beheaded combs are carried in baskets which lie up against the walls of the reel with the mid-ribs of the combs disposed circumferentially; that is to say, with the combs lying flatwise against the peripheral part of the reel. In the rotation of the reel, honey is ejected from the outwardly facing cells; the reel and the baskets are then brought to rest, and the baskets (with the combs within them) are reversed upon the direction of drive of the reel being reversed for extraction of the honey from the remainder of the cells in the rotation in the reverse direction.

In another known machine, the baskets in which the combs are placed are disposed radially and stand erect in the reel. In this machine, the honey is extracted only slowly, more particularly from the comb cells which are located near the axis of the reel, and owing to the walls of the comb cells being always at right angles to the line of centrifugal stress, protracted operation of the machine is necessary to effect complete operation of the available honey, in which case the necessarily prolonged centrifugal stress to which the combs are subjected tends to break them.

In contrast with these known machines, in the machine of the present invention, beheaded combs are placed in baskets which are disposed radially and vertically in the reel and are hinged to the reel with liberty to swing to either one or other side of radial position, for instance according to the direction of rotation of the reel, so that they will take up positions acutely angularly to the radial line and lying in lapped order while the reel is in rotation. The honey is thereby caused to run freely from the outwardly facing cells under the stress of centrifugal action.

It is very desirable to provide interceptor plates disposed between the baskets and hinged to the reel. When the reel is in rotation these plates swing with the baskets; they form partitions between the baskets and catch splashed-out honey; this honey flows downwardly over them towards the periphery of the reel and falls into the monitor, whence it is drawn off. The baskets and the interceptor plates swing on their hinge mountings in trailing order in relation to the direction of rotation of the reel.

In practice it is preferred to place the hinge mountings at the peripheral part of the reel. These hinge mountings may be fixed to the extreme ends of the baskets and the interceptor plates as shown, or they may be fixed to places on those parts near to instead of at their extreme ends. The upper hinge centres may be set closer to the axis of the reel than the lower hinge centres. This tilted hinging arrangement causes the baskets and the interceptor plates to fall by gravity into radial order when the reel is at rest, but yet permits them to swing laterally to acute angular positions and to overlap more or less while the reel is in rotation. Loading and unloading of the combs is facilitated by the radial disposition of the baskets while the reel is at rest.

In the monitor in which the reel is housed, a vertical spindle is carried on a suspension bearing and is geared to a drive shaft on the top side of the monitor. This shaft is provided with a driving handle and it carries a reversible transmission gear. A footstep steadying bearing may be provided for an extension of the reel spindle to prevent swaying of the reel, but it is not a necessary part of the design of the machine.

A machine embodying the invention is illustrated in the accompanying drawing, in which:

Fig. 1 is a vertical sectional elevation showing the monitor, the reel, the reversible transmission gear, and other parts of the structure.

Fig. 2 is a partial plan, with the transmission gear removed, showing the reel with some of the comb baskets and interceptor plates swung to one side or the other of normal radial positions into operative positions, according to the direction of rotation of the reel;

Fig. 3 is a diagrammatic plan showing an annular air circulator cover on the top of the reel;

Fig. 4 is a partial vertical sectional elevation showing the reel spindle without a footstep tail extension, and showing the tilted hinger centres; and Fig. 5 is a fragmentary plan view showing the modified arrangement in which the hinge mountings of the baskets and interceptor plates are at the inner ends of those members.

11 is the monitor casing and 12 is a bridge across its head. 13 and 14 are two bearings for the shaft 15, and 16 is a crank handle. A double bevel pinion gear 17 is feather keyed on the shaft 15; it is adapted to be shifted on the shaft to engage either one or other pinion.

The gear 17 may, however, be fixed on the drive shaft 15, as shown in the drawing, and in that case that shaft is fitted to be slidable endwise in its bearings 13 and 14 to bring either one or other of the pinions into gear with the crown wheel 18 for positive or negative direction drive, or into neutral position, to disconnect the drive. A ball latch arrangement is fitted to hold the pinions on the shaft or to hold the shaft in its bearings in any one of these positions.

The reel 20 consists of an assembly of radial frames 23 which are attached to collar flanges 24 on the spindle 19. These frames are spaced symmetrically apart; they carry angle rings 25 which are the peripheral members of the reel. Rigidity of the reel is ensured by radially disposed diagonal struts 26.

The angle rings 25 are drilled at 31 to carry pintles for the comb baskets 28, and at 27 to carry the interceptor plates 29. The upper pintle centres are preferably set closer to the axis of the reel than the lower ones, as best seen in Fig. 4.

The comb baskets 28 are each constructed of open mesh wirework on their four vertical sides; at the top they are open; across the bottom of them are bearers 30 which support the combs. The baskets are carried on pintles fitted in the rings 25 of the reel, and on these pintles the baskets are free to swing laterally to take up angular positions as shown in Fig. 2. The basket 28 may take the form of wire clips or racks adapted to support the comb in the reel.

The interceptor plates 29 are disposed intervening the baskets 28 and are carried by pintle pins 27 on the rings 25 in the same way as the baskets: they are preferably slightly longer in the radial direction than the baskets, and to stiffen them they are preferably beaded on their inner edges as shown at 45.

The spindle 19 runs in a neck bearing 32, and optionally also in a footstep bearing 33. If a footstep bearing is used it is protected from dripping honey by a central cone shield 34 which rises from the bottom 35 of the monitor 11. It is, however, preferable to omit the footstep bearing and use a head bearing 33A (see Fig. 4) in order thus to offer a clear receiver sump for the extracted honey.

The monitor bottom forms the sump for the collection of the extracted honey. A honey draw-off cock 37 is provided.

An annular air baffle ring 38 is fitted on the top of the monitor 11 (Fig. 3) leaving a central space 39 round the bearing 32 for indraught of air, and an annulus space 40 to allow air driven by centrifugal action to pass out.

In operation, the baskets 28 are charged with beheaded or decapped combs containing honey, and the reel 20 is rotated by means of the crank handle 16, or may be by power. When the rotation is in the right handed direction, as indicated by the arrow A, the inner ends of the baskets 28 and plates 29 lag as shown at C and come to a crowded lapping position at their inner ends, each basket setting at an acute angle with respect to the radial line through its hinge mounting and resting against respective adjacent interceptor plates 29. Honey is ejected from the combs through the baskets at 41 onto the interceptor plates and onto the wall of the monitor 11, and flows thence to the sump. When the direction of rotation is reversed, as shown by the arrow B, the baskets and interceptor plates swing to and lag at the other side of the radial line, and the honey is then thrown from the other side of the combs at 43 onto the other side of the interceptor plates at 44, and passes down, as before, to the sump.

Air impelled by the rotating parts is drawn downwards through the opening 39 and moving radially outward passes with considerable velocity through the baskets 28, tending to sweep the honey from the combs. The air discharges through the annulus 40.

The preceding description is sufficiently clear without supplementing it to explain the modified arrangement shown in Fig. 5, in which the baskets and the interceptor plates are hung at or near their inner ends.

What I claim as my invention and desire to secure by Letters Patent is:

1. A honey extractor comprising a rotary reel, a plurality of holders for honeycomb on said reel, and means for pivotally supporting said holders on the reel in substantially vertical positions in which the inner and outer portions of the holders are held, during rotation of the reel, with the inner portions relatively close to the center of the reel and the outer portions relatively remote from said center and with the principal planes of the holders extending tangentially to a circle coaxial with the reel and which is small relative to a circle concentric therewith and intercepting the outer portions of the holders, said principal planes of said holders extending more nearly radially than chordally of the path of movement of the outer limits of the holders.

2. In a honey extractor comprising a rotor mounted to be turned on a substantially vertical axis, a series of holders for honeycombs pivotally mounted for generally horizontal movement on and relative to the rotor, the combination of means limiting the pivotal movement of the holders in two directions so that the holders can occupy two operating positions in which the principal planes of the holders extend nonradially of the rotor, but more nearly radially thereof than tangentially to the path of movement of the outer limits of the holders and more nearly radially than chordally to said path of movement, whereby the inertia force on the holders greatly predominates over centrifugal force and operates to constrain the holders when carrying honeycombs to movement from one operating position to the other both upon initiation of and cessation of rotation of the rotor.

3. An extractor according to claim 2, wherein the holders are pivoted to the rotor on axes that are inclined relative to the upright rotor axis whereby upon cessation of rotational movement of the rotor, the weight of the holders tends to swing the holders into radial position with respect to the rotor.

4. A honey extractor comprising a carrier constructed and arranged to rotate on an upright axis, a series of comb holders pivoted on the carrier, the pivots of the holders being disposed substantially upright, substantially equally spaced circumferentially of the carrier, and spaced substantially uniform distances remotely of the axis of rotation of the carrier, and honey interceptor plate members pivoted between the holders in circumferentially spaced relation to the pivots of adjacent holders, each plate member extending between two adjacent holders and beyond the same from the holder pivots in a manner to engage the two adjacent holders as a limiting means when the members and holders are swung on their pivots in either direction through predetermined arcs.

5. A honey extractor comprising a rotatable reel, a symmetrical assembly of holders pivotally supported on substantially vertical axes on the reel and in which the inner and outer portions of the holders are held, during rotation of the reel, with the principal planes of the holders extending tangentially to a circle coaxial with the reel and which is small relative to a circle concentric therewith and intercepting the outer portions of the holders, an enclosing casing supporting the reel, and means for turning the reel selectively in opposite directions; characterized in that the holders each swing to two non-radial positions with their principal planes more nearly radially of the reel than tangentially chordally of the path of rotation of the outer limits of the holders, whereby each of the holders becomes shifted so that respective planes thereof move automatically from one side of the axis of rotation to the other consequent upon a reversal of the direction of rotation of the reel.

6. A centrifugal honey extractor of the character described, comprising a rotary reel, pivot axes, comb supporting members hung pivotally in the reel on said axes, said pivot axes being substantially vertical and parallel with the reel axis, and honey-interceptor plates hung in the reel between the comb supporting members and spaced therefrom and serving to prevent honey of a comb in one member from being thrown onto a comb in an adjacent member.

7. A honey extractor comprising a rotatable reel, a symmetrical assembly of comb supporting members pivotally hung thereon, an enclosing casing, means for driving the reel in either clockwise or counterclockwise direction, and pivot axes which are substantially vertical and parallel with the reel axis and disposed at substantially uniform distances from the axis of rotation of said reel, said comb supporting members being arranged on said axes whereby the comb supporting members swing to acute angular positions with respect to radial lines on either side of the radial lines according to the direction of rotation of the reel so as thereby to facilitate extraction of honey alternately from the cells on the respective sides of combs in the comb supporting members by centrifugal action in correspondence with the direction of rotation of the reel, and interceptor plates disposed intermediate the comb supporting members and acting as deflector surfaces for honey coming from the combs in the respective adjacent members.

CLARENCE ARTHUR HUNGERFORD.